A. E. HOBSON.
INSULATED HANDLE FOR METAL VESSELS.
APPLICATION FILED JAN. 6, 1915.
1,137,972.
Patented May 4, 1915.
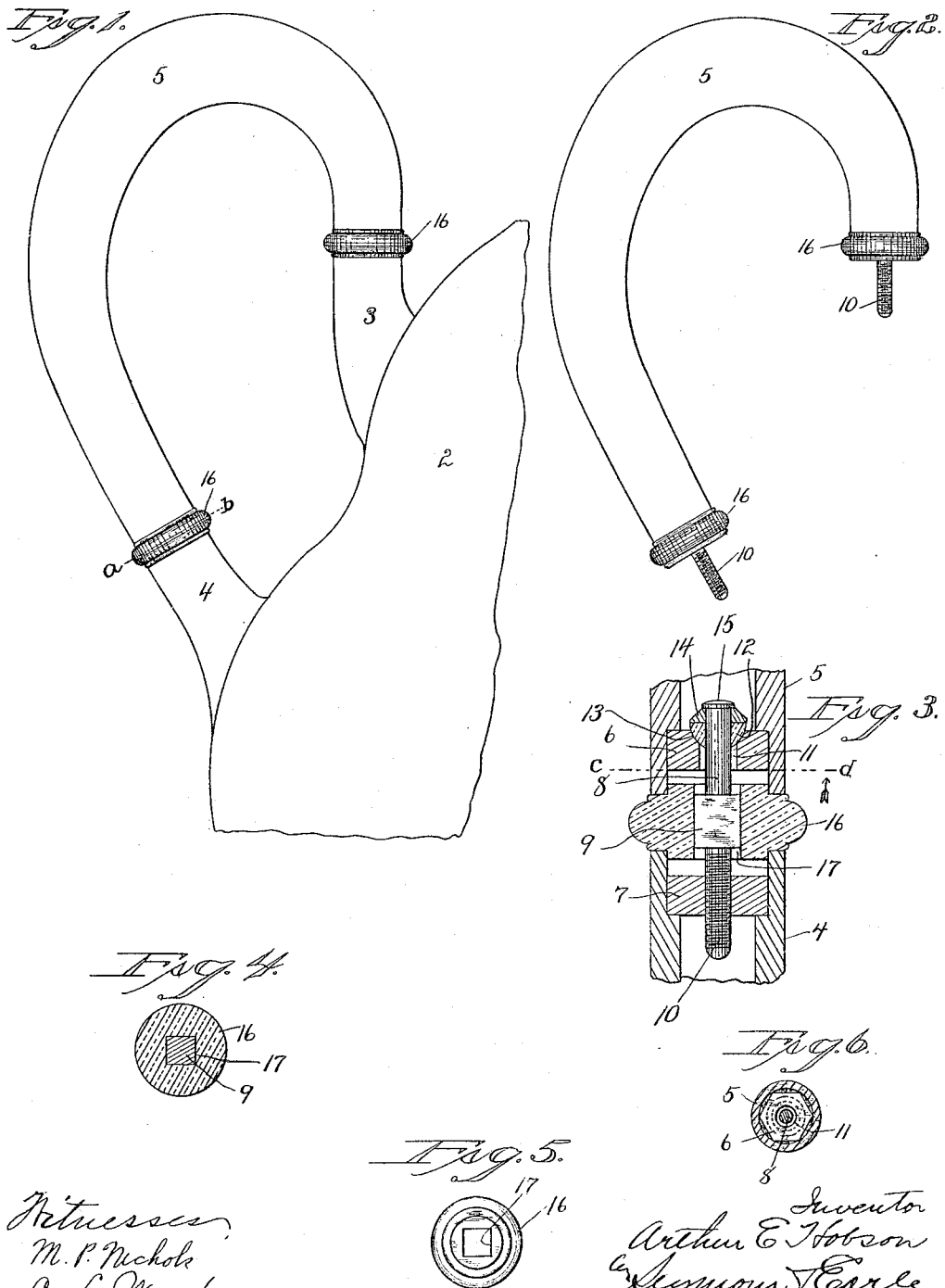

UNITED STATES PATENT OFFICE.

ARTHUR E. HOBSON, OF MERIDEN, CONNECTICUT, ASSIGNOR TO INTERNATIONAL SILVER CO., OF MERIDEN, CONNECTICUT, A CORPORATION OF NEW JERSEY.

INSULATED HANDLE FOR METAL VESSELS.

1,137,972.  Specification of Letters Patent.  Patented May 4, 1915.

Application filed January 6, 1915. Serial No. 810.

*To all whom it may concern:*

Be it known that I, ARTHUR E. HOBSON, a citizen of the United States, residing at Meriden, in the county of New Haven and State of Connecticut, have invented a new and useful Improvement in Insulated Handles for Metal Vessels; and I do hereby declare the following, when taken in connection with the accompanying drawings and the characters of reference marked thereon, to be a full, clear, and exact description of the same, and which said drawings constitute part of this application, and represent in—

Figure 1 a side view of a portion of a metal vessel provided with a handle insulated therefrom in accordance with my invention. Fig. 2 a side view of the handle portion, detached, showing the insulators applied to its opposite ends. Fig. 3 a vertical sectional view, enlarged, showing one end of the handle and a part of its corresponding socket with my improved insulator located between them. Fig. 4 a sectional view on the line *a—b* of Fig. 1. Fig. 5 a plan view of the insulator, detached. Fig. 6 a sectional view on the line *c—d* of Fig. 3 on a reduced scale.

This invention relates to an improvement in insulated handles for metal vessels, such as tea, coffee and hot water pots in which the insulator is inserted between the ends of the handle and the sockets with which the ends are connected. Insulations for this purpose are designed to reduce the metallic contact between the pot and the handle. In the manufacture of these vessels it is desirable to finish the handles and the sockets with which they are to be connected before assembling. Furthermore, in use, particularly in hotels and restaurants, these vessels are subject to hard usage and frequently need refinishing; and in refinishing it is desirable to remove the handles, or at least to remove the insulator so that in replating the liquid will not enter the handles which are hollow.

The object of this invention is to provide an insulator which may be firmly secured in place and which in a sense forms the interlocking means between the ends of the handle and its sockets and provide perfect insulation between the pot and handle; and the invention consists in the construction hereinafter described and particularly recited in the claim.

In carrying out my invention I provide the vessels 2 with sockets 3 and 4 in the usual manner. The handle 5 is adapted at its ends to be connected to the sockets 3 and 4. In each end of the handle I locate a washer 6 which may be angular or otherwise, as shown in Fig. 6, adapting it to be firmly soldered into the ends of the handle. In each socket I locate a nut 7. Before fixing the washer 6 in position I pass through it a pin 8 projecting beyond the head 9 of a screw 10, and it is to be noted that the opening 11 through the washer 6 is greater in diameter than the diameter of the pin 8.

Over the end of the pin is set a block 12 of hard rubber or other suitable insulating material, and the under face of this block is rounded to rest in a cup-shaped seat 13 formed in the upper face of the washer 6. Above the block 12 is a collar 14 which is held in place by upsetting the upper end 15 of the pin. The insulator 16 is of suitable diameter and has an angular opening 17 to closely fit the head 9 of the screw. Into the opposite ends of the handle 5 the washers 6 are firmly secured in place so as to hold the screws 8. The insulators 16 are then placed over the heads 9 and the screws 10 entered into the nuts 7 in the sockets 3 and 4. By turning the insulators the heads are rotated so as to turn the screws into the nuts 7 thereby drawing the ends of the handle into close engagement with the sockets 3 and 4. The edges of the handle and the edges of the socket coming to a bearing against the insulator in the usual way.

By providing play for the pin 8 through the washer 6, provision is made for slight turning of the end of the handle so as to compensate for slight variations in alinement, and by providing the insulating block 12 between the pin and the washer, heat will not be transferred by the screw and pin from the sockets to the handle. With this construction the handles may be removed when necessary by simply turning the insulator which turns the screws 10 out of engagement with the nuts 7.

I claim:—

The combination with a metal vessel having handle sockets applied thereto, of a handle, one of said parts having a washer firmly secured therein, the outer face of said washer formed with a seat, the other part provided with a nut firmly secured therein, an insulator between the ends of the handles and said sockets, a screw extending through said insulator and having a head to be engaged thereby, one end of the screw threaded to enter said nut, the opposite end provided with a headed pin extending through the washer, and an insulator block on the said pin beneath the head, said block rounded and adapted to enter the seat in said washer.

In testimony whereof, I have signed this specification in the presence of two subscribing witnesses.

ARTHUR E. HOBSON.

Witnesses:
M. E. CURRIER,
I. A. O'NEILL.

Copies of this patent may be obtained for five cents each, by addressing the "Commissioner of Patents, Washington, D. C."